(12) United States Patent
Chen

(10) Patent No.: US 9,073,388 B2
(45) Date of Patent: Jul. 7, 2015

(54) BICYCLE RIM

(71) Applicant: JALCO INDUSTRY CO., LTD., Changhua Hsien (TW)

(72) Inventor: Han-Tsung Chen, Changhua Hsien (TW)

(73) Assignee: JALCO INDUSTRY CO., LTD., Changhua Hsien (TW)

( * ) Notice: Subject to any disclaimer, the term of this patent is extended or adjusted under 35 U.S.C. 154(b) by 283 days.

(21) Appl. No.: 13/718,873

(22) Filed: Dec. 18, 2012

(65) Prior Publication Data
US 2013/0169029 A1 Jul. 4, 2013

(30) Foreign Application Priority Data

Dec. 29, 2011 (TW) .............................. 100224913 U

(51) Int. Cl.
*B60B 21/06* (2006.01)
(52) U.S. Cl.
CPC .......... B60B 21/062 (2013.01); *B60B 2900/311* (2013.01)
(58) Field of Classification Search
CPC .. B60B 21/062; B60B 21/064; B60B 21/068; B60B 21/06; B60B 21/026; B60B 21/025; B60B 21/044; B60B 21/12; B60B 21/003; B60B 1/003; B60B 1/043; B60B 1/044

USPC .................... 301/95.104, 95.106, 58, 95.108; 152/379.3, 379.4, 379.5

See application file for complete search history.

(56) References Cited

U.S. PATENT DOCUMENTS

| 5,499,864 | A | * | 3/1996 | Klein et al. | ............... | 301/95.104 |
| 2007/0273197 | A1 | * | 11/2007 | Smith | .............................. | 301/58 |
| 2011/0204706 | A1 | * | 8/2011 | Erler et al. | ....................... | 301/55 |
| 2011/0266863 | A1 | * | 11/2011 | Gittani et al. | .................... | 301/58 |

FOREIGN PATENT DOCUMENTS

DE 9207194 U1 * 5/1992

* cited by examiner

*Primary Examiner* — S. Joseph Morano
*Assistant Examiner* — Jean Charleston

(57) ABSTRACT

A bicycle includes a notch centrally defined therein and two support portions respectively formed on two opposite edges of the notch, wherein each support portion complementally corresponds to lateral nipples. The bottom of the notch is divided into a first inclined face and a second inclined face. Each inclined face has a series of first through holes equally and vertically defined therein such that each first through hole has an axis forming an angle with a corresponding one of the diameters of the bicycle rim, wherein the first through holes in the first inclined face are interlaced to that in the second inclined face.

4 Claims, 5 Drawing Sheets

BICYCLE RIM

BACKGROUND OF THE INVENTION

1. Field of the Invention

The present invention relates to a rim, and more particularly to a bicycle rim that has an advantageously altered structure for coupling spokes and nipples.

2. Description of Related Art

A conventional bicycle rim (1) in accordance with the prior art shown in FIG. 5 usually has a tire (2) peripherally engaged thereto when using. The conventional bicycle rim (1) comprises a series of first through holes (9) defined therein and each first through hole (9) co-axially aligns with a corresponding one of the radii of the conventional rim (1). Each first through hole (9) has a nipple (3) extending therethrough for pulling a spoke (4) that has one end adapted to be engaged to a hub (not shown) of a bicycle (not shown). An inner rim (5) is formed in the rim (1) for strengthening the structure of the rim (1). For conveniently rotating the nipple (3) to adjust the tension of the spoke (4), a series of second through holes (8) is defined in the inner rim (5) and each second through hole (8) aligns with a corresponding one of the first through holes (9). Each second through hole (8) has a plug (7) inserted thereinto after finishing adjusting the tension of the spoke (4). A lining (6) is completely applied on the inner rim (10) to prevent the high pressure air in the tire (2) from exhausting through the second through hole (8) and the first through hole (9).

However, the rim (1) should be slightly transformed when loading the weight of the rider and the bicycle, and the rim should lose its roundness. A first radius, vertical to the ground, of the rim (1) will slightly shortened and two second radii, vertical to the first radius will slightly lengthened such that the spokes (4) relative to the second radii load a greater tension than other spokes (4). However, the spoke (4) relative to the first radius is loosened and the nipple (3) connected to the spoke (4) relative to the first radius is loose relative to the rim (1). The spoke (4) and the nipple (3) relative to the first radius are tightened when the rim (1) is rotated. Consequently, all the spokes (4) are repeatedly tightened and loosened. The tension of each of the spokes (4) may be changed when the nipple (3) does not completely abut against the inner periphery of the rim (1). It is very dangerous when the spoke (4) is broken due to an improper tension.

The present invention has arisen to mitigate and/or obviate the disadvantages of the conventional rim and the connection to the spoke.

SUMMARY OF THE INVENTION

The main objective of the present invention is to provide an improved bicycle rim that has an advantageously altered structure for coupling spokes and nipples.

To achieve the objective, the bicycle rim in accordance with the present invention comprises a notch centrally defined therein and two support portions respectively formed on two opposite edges of the notch, wherein each support portion complementally corresponds to lateral nipples. The bottom of the notch is divided into a first inclined face and a second inclined face. Each inclined face has a series of first through holes equally and vertically defined therein such that each first through hole has an axis forming an angle with a corresponding one of the diameters of the bicycle rim, wherein the first through holes in the first inclined face are interlaced to that in the second inclined face.

The bicycle rim in accordance with the present invention includes the thick portion, the inclined faces and the support portions to guide and position the nipples in the purpose angle, and enlarge the connecting area between the nipples and the bicycle rim. Consequently, the nipple mounted into the bicycle rim of the present invention always moves back to its original position to keep each spoke has a same tension and the roundness of the bicycle rim in accordance with the present invention.

Further benefits and advantages of the present invention will become apparent after a careful reading of the detailed description with appropriate reference to the accompanying drawings.

DETAILED DESCRIPTION OF THE INVENTION

Figure 1:
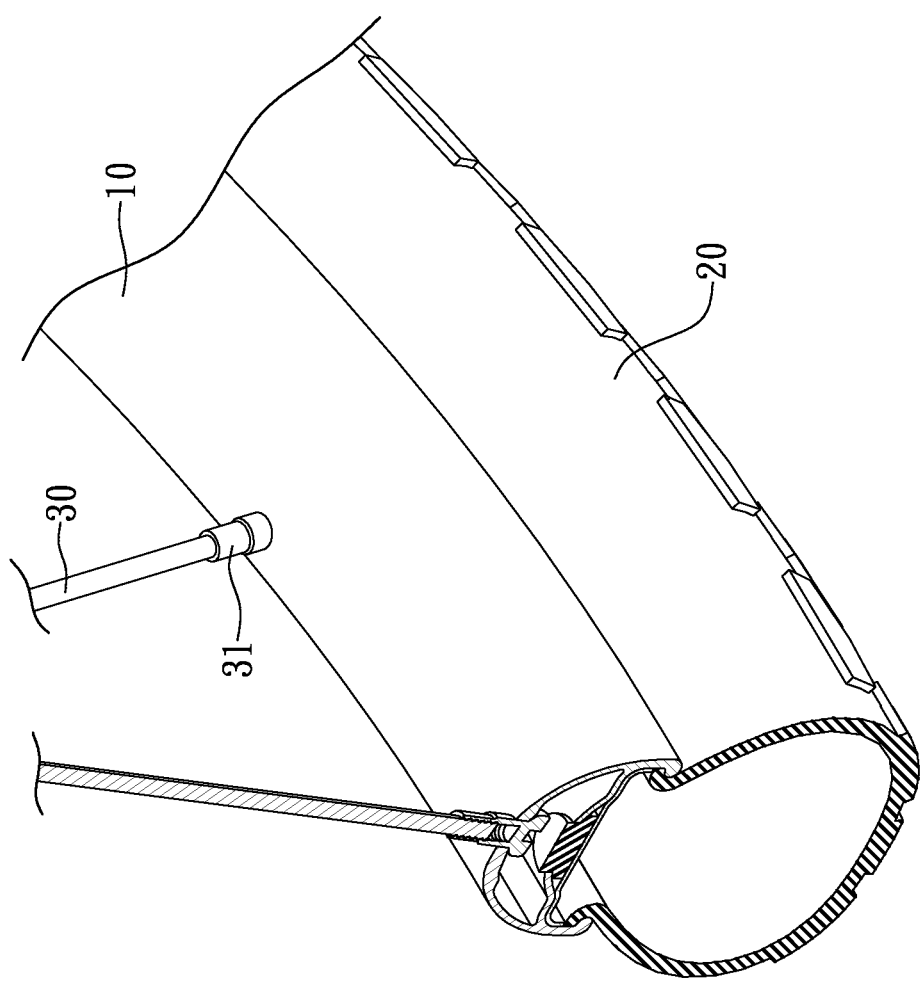
FIG. 1 is a cross-sectional view of a bicycle rim in accordance with the present invention when combined with a tire.
Figure 2:
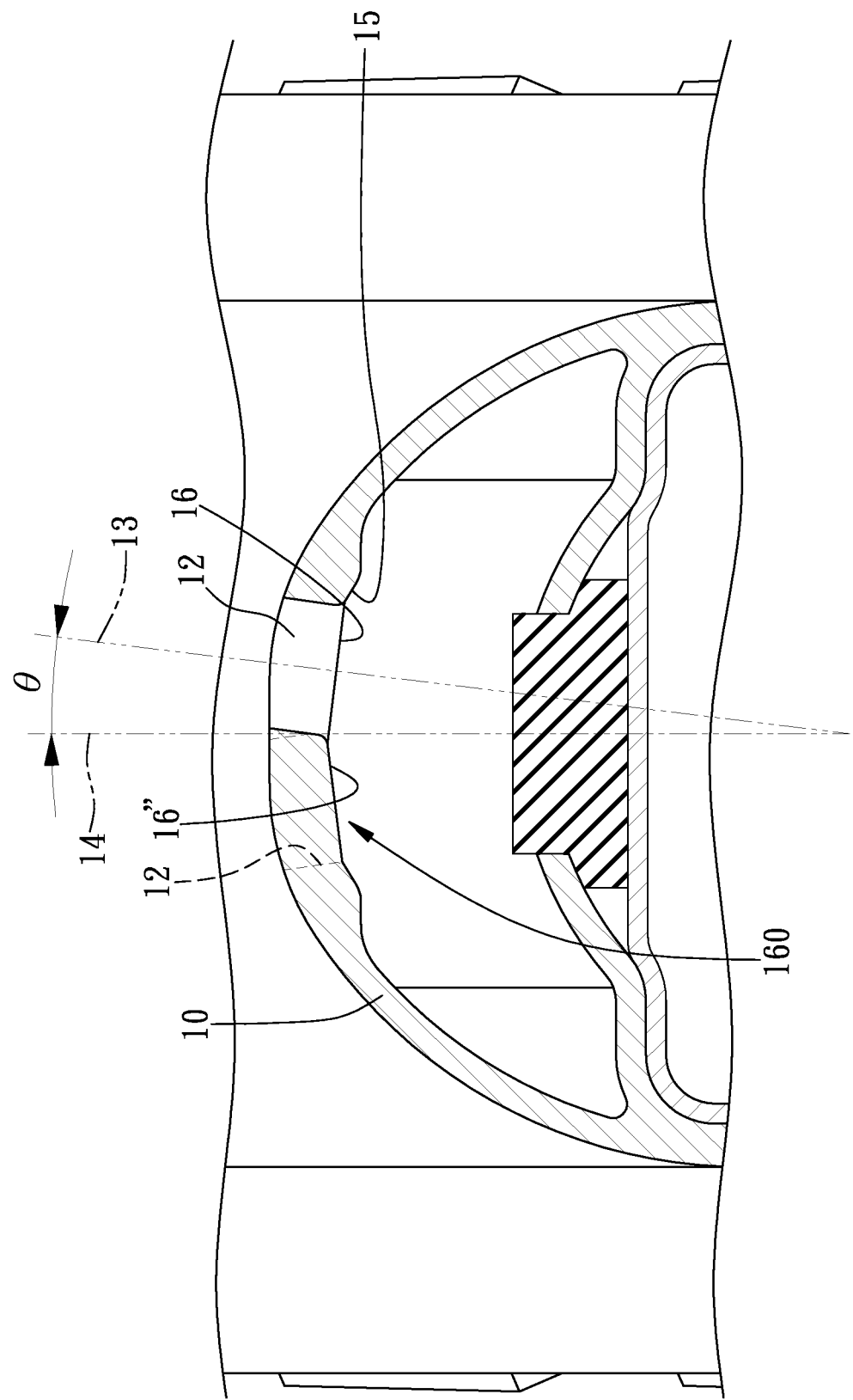
FIG. 2 is a partially cross-sectional view of the bicycle rim in accordance with the present invention.
Figure 3:
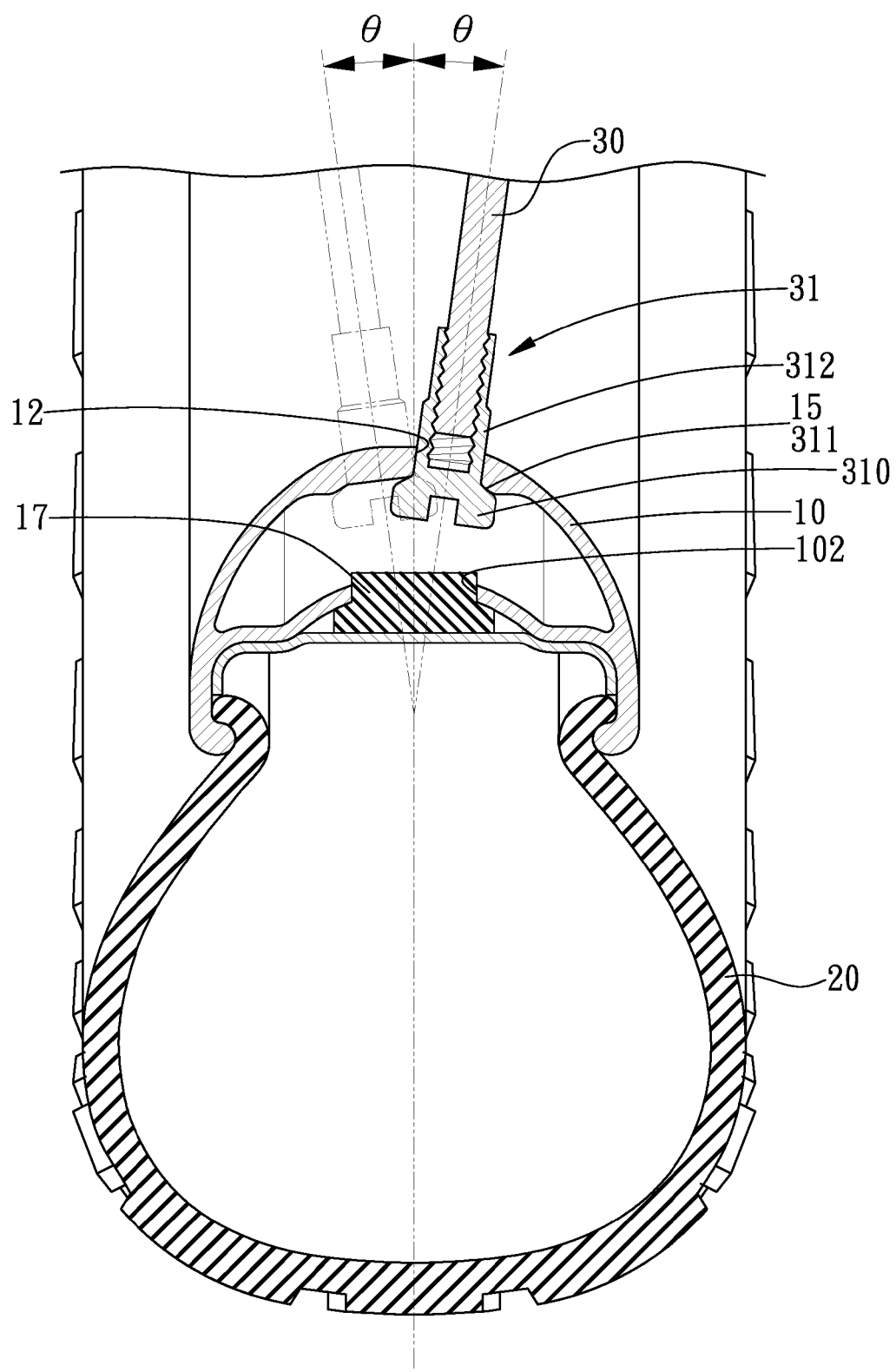
FIG. 3 is a cross-sectional view of the bicycle rim when the spoke and the nipple are mounted thereon.

Referring to the drawings and initially to FIGS. 1-3, a bicycle rim (10) in accordance with the present invention comprises multiple nipples (31) equally extending therethrough for mounting multiple spokes (30), wherein the nipple (31) has an enlarged head (310) and a tubular structure (312) centrally extending from the enlarged head (310) such that a shoulder (311) is formed between the enlarged head (310) and the tubular structure (312). The spokes (30) has one end engaged to a hub (not shown) for keeping roundness and strengthening the structure of the bicycle rim (10). When using, a tire (20) is combined with the bicycle rim (10) for promoting the friction force to the bicycle.

The bicycle rim (10) has a thick portion (11) centrally and peripherally formed thereon. A notch (160) is centrally defined in the thick portion (11) and two support portions (15) are respectively formed on two opposite edges of the notch (160), wherein each support portion (15) complementally corresponds to the shoulder (311) of a corresponding one of the nipples (31). The bottom of the notch (160) is divided into a first inclined face (16) and a second inclined face (16") that correspond to each other. Each of the first inclined face (16) and the second inclined face (16") has a series of first through holes (12) equally and vertically defined therein such that each first through hole (12) has an axis (13) forming an angle (θ) with a corresponding one of the diameters of the bicycle rim (10). The first through holes (12) in the first inclined face (16) are interlaced to that in the second inclined face (16"). When mounting the nipple (31), the enlarged head (310) of each of the nipple (31) stably abuts against a corresponding one of the first inclined face (16) and the second inclined face (16"). In addition, the shoulder (311) of each of the nipple (31) is engaged to a corresponding one of the two support portions (15) for promoting the connection between the nipples (31) and the bicycle rim (10).

Figure 4:
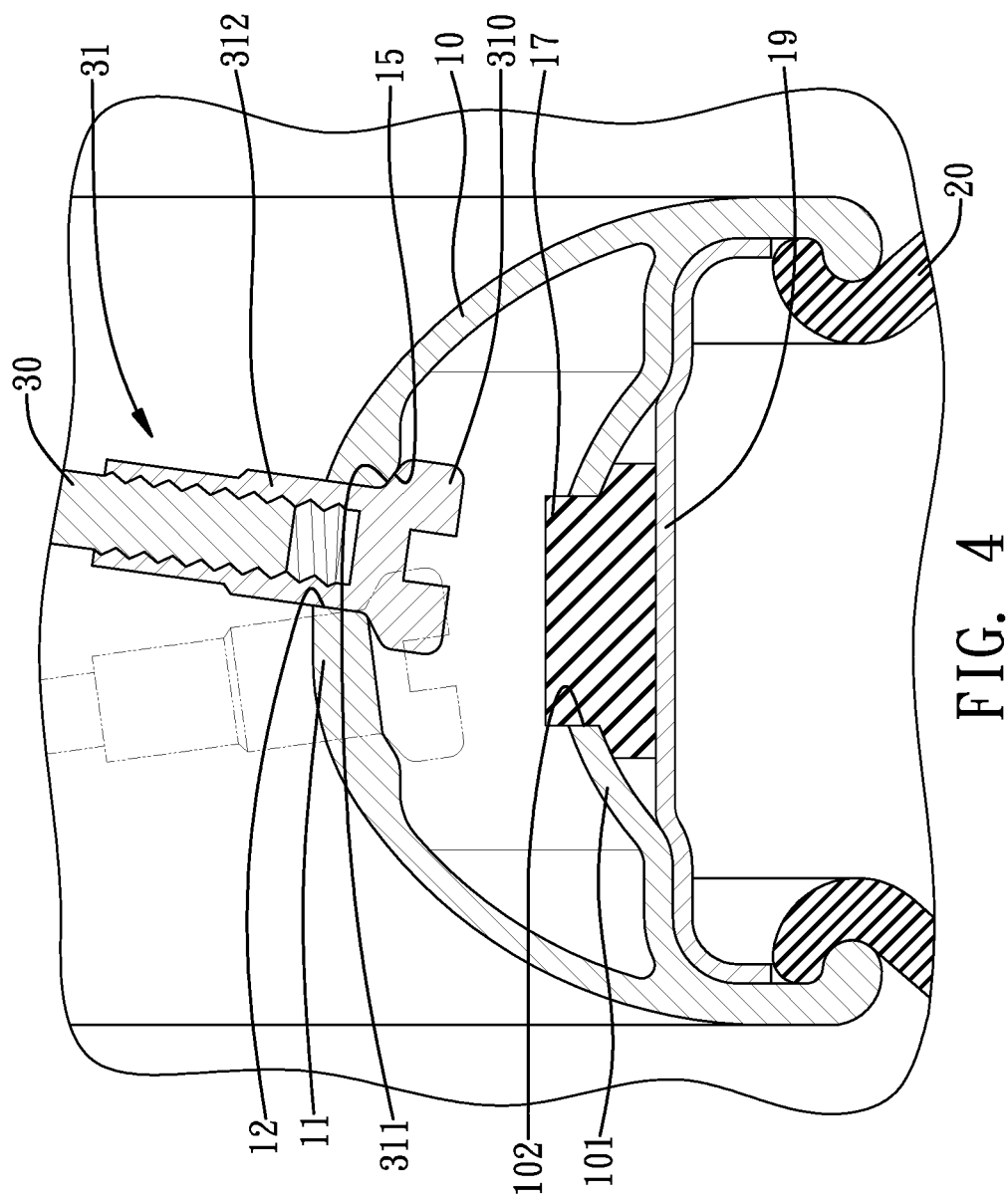
FIG. 4 is an enlarged view of the bicycle rim in FIG. 3.
Figure 5:
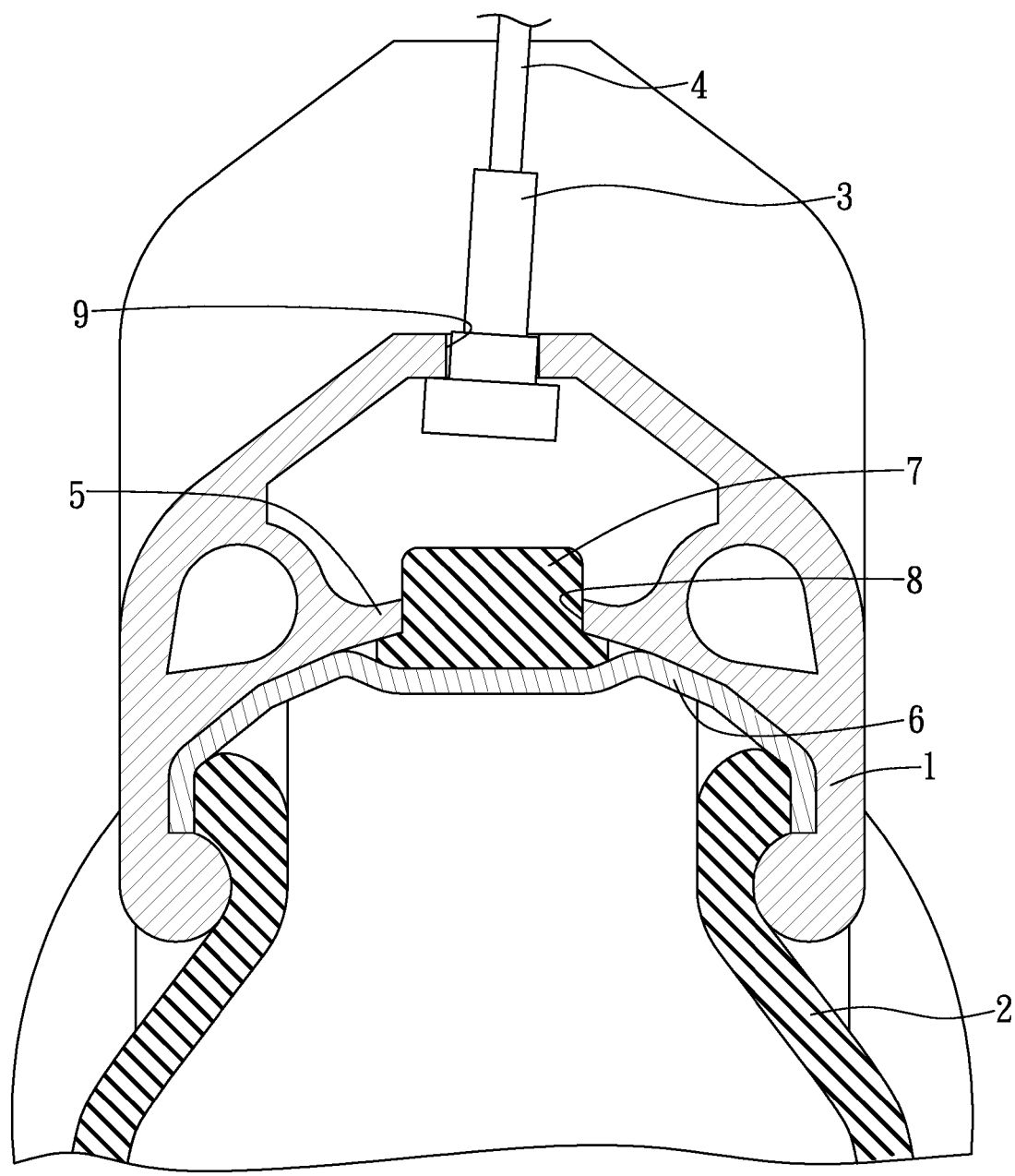
FIG. 5 is a cross-sectional view of a conventional bicycle rim in accordance with the prior art.

With reference to FIG. 4, the bicycle rim (10) in accordance with the present invention is formed with an inner rim (101)

for promoting the strength of the bicycle rim (10). A series of second through holes (102) is defined in the inner rim (101). Each second through hole (102) aligns with a corresponding one of the first through hole (12) in the first inclined face (16)/the second inclined face (16") for operator to easily rotate the nipple (31) and adjust the tension of the spoke (30) by inserting a tool through the second through hole (102). Each second through hole (102) has a plug (17) inserted thereinto after adjusting the tension of the spoke (30) and a lining (19) is peripherally applied to the inner rim (101) to prevent the high pressure air in the tire (20) from exhausting from the second through hole (102), and the first through hole (12).

As described above, the bicycle rim (10) in accordance with the present invention the thick portion (11), the inclined faces (16, 16") and the support portions (15) to guide and position the nipples (31) in the purpose angle (0), and enlarge the connecting area between the nipples (31) and the bicycle rim (10). Consequently, the nipple (31) mounted into the bicycle rim (10) of the present invention always moves back to its original position to keep each spoke (30) has a same tension and the roundness of the bicycle rim (10) in accordance with the present invention.

Although the invention has been explained in relation to its preferred embodiment, it is to be understood that many other possible modifications and variations can be made without departing from the spirit and scope of the invention as hereinafter claimed.

What is claimed is:

1. A bicycle rim comprising a thick portion centrally formed thereon, a notch centrally defined in the thick portion, and two support portions formed on two opposite edges of the notch, made thicker than the thick portion and adapted for contacting and supporting nipples, wherein the thick portion includes a first inclined face and a second inclined face extending beside each other wherein each of the first inclined face and the second inclined face includes a series of through holes perpendicularly defined therein to render each of the nipples perpendicular to a corresponding one of the first and second inclined faces when the nipple is inserted in a corresponding one of the through holes, wherein the through holes in the first inclined face are interlaced with that in the second inclined face.

2. The bicycle rim as claimed in claim 1 further comprising an inner rim formed thereon for enhancing the strength of the bicycle rim and made with a series of through holes corresponding to the through holes in the first and second faces for a user to easily rotate the nipple and adjust the tension of the spoke.

3. The bicycle rim as claimed in claim 2, further including plugs each inserted in a corresponding one of the through holes made in the inner rim.

4. The bicycle rim as claimed in claim 2 further comprising a lining applied to the inner rim after the plugs are inserted into the through holes made in the inner rim.

* * * * *